(12) United States Patent
Walter et al.

(10) Patent No.: US 7,414,486 B2
(45) Date of Patent: Aug. 19, 2008

(54) DEVICE AND METHOD FOR POWER CALIBRATION OF AN OSCILLATOR

(75) Inventors: Thomas Walter, Renningen (DE); Dirk Steinbuch, Wimsheim (DE)

(73) Assignee: Robert Bosch GmbH, Stuttgart (DE)

( * ) Notice: Subject to any disclaimer, the term of this patent is extended or adjusted under 35 U.S.C. 154(b) by 179 days.

(21) Appl. No.: 10/545,634

(22) PCT Filed: Oct. 24, 2003

(86) PCT No.: PCT/DE03/03534

§ 371 (c)(1),
(2), (4) Date: May 30, 2006

(87) PCT Pub. No.: WO2004/070938

PCT Pub. Date: Aug. 19, 2004

(65) Prior Publication Data

US 2007/0035811 A1    Feb. 15, 2007

(30) Foreign Application Priority Data

Feb. 3, 2003    (DE) .............................. 103 04 137

(51) Int. Cl.
*H03B 1/00* (2006.01)

(52) U.S. Cl. .......................... 331/74; 331/182; 331/183; 331/185; 330/140

(58) Field of Classification Search .................. 331/74, 331/182, 183, 185; 330/140
See application file for complete search history.

(56) References Cited

U.S. PATENT DOCUMENTS 3,737,680 A     6/1973  Uchida

2004/0135628 A1 *  7/2004  Kruck ........................ 330/140

FOREIGN PATENT DOCUMENTS

JP    55-086209    6/1980

OTHER PUBLICATIONS

Lebedev I V, Shnitnikov A S: Operating Singulatities of Detector Diodes on Microwave Control Devices: Radioelectronics and Communications System, vol. 32, No. 10, pp. 78-80,1989, XP009027821, X-Schrift. UDC 621.372.65. pp. 73-75.
Drozdoskaia L: "RF Frequency Properties of a Reverse Biased Thick Switching Pin-Diode." IEEE, Sep. 10, 2000, pp. 147-150,XP010521053, X-Schrift.
Murav'ev V.V., Tamelo A.A., and Godun G.A.: "Simulation of Electron Transport in Heterostructures," Izvestiya Vuz. Radioelektronika, vol. 32, No. 10, pp. 80-81, 1989. pp. 76-77.
Asbeck P M et al: "Synergistic Design of DSP and Power Amplifiers for Wireless Communications," IEEE Transactions on Microwave Theory and Techniques, vol. 49, No. 11, Nov. 2001. p. 2163-2169, XP001110337, A-Schrift.

* cited by examiner

*Primary Examiner*—Arnold Kinkead
(74) *Attorney, Agent, or Firm*—Michael J. Striker

(57) ABSTRACT

It is therefore the object of the present invention to disclose a device for power calibration of an oscillator in the high-frequency range, which has a reduced number of components and/or has less-expensive components. A method for power calibration of an oscillator is also to be disclosed, which eliminates the disadvantages of the known methods, that is, determining the output power of the oscillator via an additional, expensive component. To that end, the input (31) of the control module (40) is embodied as electrically connectable to the HF switch (comprising (22) and (24)) and the output (34) of the control module (40) is embodied as electrically connectable to the HF switch and/or to the amplifier. If the HF switch is then not acted upon by an input signal (pulse or direct voltage), but instead if the voltage is measured at the control input (30) of the HF switch, then the required controlled variable (the HF output power) is achieved, since the PIN diodes of the HF switch rectify the apply HF power and generate a proportional direct voltage.

8 Claims, 3 Drawing Sheets

DEVICE AND METHOD FOR POWER CALIBRATION OF AN OSCILLATOR

CROSS-REFERENCE TO A RELATED APPLICATION

The invention described and claimed hereinbelow is also described in German Patent Application DE 10304137.0 filed on Feb. 3, 2003. This German Patent Application, subject matter of which is incorporated herein by reference, provides the basis for a claim of priority of invention under 35 U.S.C. 119(a)-(d).

FIELD OF THE INVENTION

The invention relates to a device and a method for power calibration of an oscillator, having the characteristics recited in the preamble to claim 1 and to claim 8, respectively.

BACKGROUND OF THE INVENTION

With a pulse radar sensor, distances of objects can be determined very exactly. Therefore, a pulse-radar-based device in vehicles is suitable for instance as a parking aid or as a precrash sensor, or for detecting objects in the region of what is known as the blind angle. In all these usage instances, the goal is to monitor the near surroundings of a vehicle for whether obstacles that could be collided with are located in that region and to find the distance between these obstacles and the vehicle. Pulse radar sensors have an oscillator in the gigahertz range. In the course of mass-production development, it is desirable to be able to perform frequency and power calibrations for such oscillators in an automated way.

It is known to perform the power calibration for an oscillator via a buffer amplifier that directly follows the oscillator. The amplifier is connected to the oscillator output via an HF switch, which as a rule has two diodes. This buffer makes it possible to vary the HF output power by changing the drain voltage of the amplifier, which may be implemented as a simple transistor. After a power determination at the output of the buffer, it is possible with the aid of the control module (such as a closed control loop) to readjust the drain voltage, and thus over the course of temperature and process and component fluctuations, a constant output power can be attained. An upper limit to this output power is set by certification regulations, and this upper limit should always be fully exploited if maximum power is to be obtained. The measured HF output power serves in this case as a controlled variable, for readjusting the drain voltage of the "buffer" final control element. In the prior art, it is known for a detector diode, which generates a direct voltage proportional to the power, to be used as a measuring member. This detector diode is coupled to the line, and the regulation is designed in accordance with the characteristic curve of the diode, including the coupling.

A disadvantage of the known devices in the prior art is particularly the use of an expensive semiconductor (the detector diode), as well as the not inconsiderable space required for this component.

SUMMARY OF THE INVENTION

It is therefore the object of the present invention to disclose a device for power calibration of an oscillator in the high-frequency range, which has a reduced number of components and/or has less-expensive components. By this means, a cost advantage in production, compared to devices in the prior art, as well as a reduced space requirement are to be attained.

A method for power calibration of an oscillator is also to be disclosed, which eliminates the disadvantages of the known methods, that is, determining the output power of the oscillator via an additional, expensive component.

This object is attained by a device for power calibration of an oscillator, having an amplifier and an HF switch, which has at least one diode, for varying the HF output power of the oscillator, and having a control module for comparing the HF output power of the oscillator with a set-point power and for controlling the amplifier, wherein the input of the control module is electrically connectable to the control input of the HF switch, and the output of the control module is electrically connectable to the control input of the HF switch and/or with the amplifier.

This object is also obtained by a method for power calibration of an oscillator by measurement and variation of the HF output power of the oscillator, wherein via an HF switch, an HF signal for measuring the HF output power of the oscillator is decoupled, and a blocking voltage for varying the output power of the oscillator is fed.

A special advantage of the invention is that the functionality of an existing component, namely the HF switch, is utilized as a measurement member. To that end, the input of the control module is embodied as electrically connectable to the HF switch and the output of the control module is embodied as electrically connectable to the HF switch and/or to the amplifier. The HF switch preferably comprises two PIN diodes in one line, which each, depending on their state (conducting/blocked), by impedance transformation generate a short circuit or idling at the HF line. If the HF switch is then not acted upon by an input signal (pulse or direct voltage), but instead if the voltage is measured at the control input of the HF switch, then the required controlled variable (the HF output power) is achieved, since the PIN diodes of the HF switch rectify the apply HF power and generate a proportional direct voltage.

To make it possible to use the control input of the HF switch bidirectionally (on the one hand for feeding in a blocking voltage for varying the HF output power, and on the other for measuring the HF output power), in a preferred variant embodiment a distributor switch is provided, which selectively switches over to feeding in the blocking voltage or to measuring the diode voltage.

In a further variant embodiment, however, this distributor switch can be dispensed with, if the D/A converter (belonging to the control module) is hard-wired to the control input of the HF switch, and the D/A converter is switched to the tristate mode during the measurement of the (PIN) diode voltage, and thus by its high-impedance performance does not exert any interfering influence on the measurement of the diode voltage.

In a further variant embodiment, an autonomic power calibration is provided, by means of a differential amplifier only on the HF board. The blocking voltage is still specified as before by the control module and serves as a reference voltage for the differential amplifier.

In the method of the invention for power calibration of an oscillator by measurement and variation of the HF output power, an HF signal for measuring the HF output power of the oscillator is decoupled and a blocking voltage for varying the output power of the oscillator is fed in, both via an HF switch.

In a preferred variant embodiment, feeding in of a blocking voltage for varying the HF output power of the oscillator is interrupted during the decoupling of the HF signal for measuring the HF output power of the oscillator.

DESCRIPTION OF THE PREFERRED EMBODIMENTS

Further preferred features of the invention will become apparent from the characteristics recited in the dependent claims.

BRIEF DESCRIPTION OF THE DRAWINGS

The invention is described below in exemplary embodiments in further detail in conjunction with the accompanying drawings.

Shown are.

BEST MODE FOR EMBODYING THE INVENTION

Figure 1:
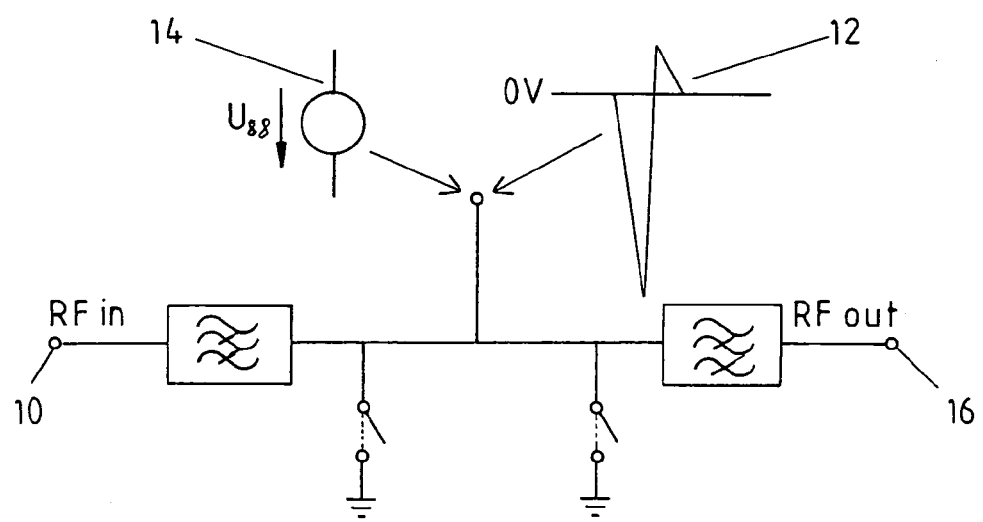
FIG. 1, a schematic circuit diagram for power calibration of an oscillator, with feeding in of an external blocking voltage and of a pulse.

FIG. 1 shows the basic construction of a device for power calibration of an oscillator in the high-frequency range. The HF signal arriving from the oscillator output 10 can be acted upon by an external blocking voltage 14 and/or a pulse 12. As a result of the blocking voltage 14, the HF switch (not shown here) acts either to conduct or to block. As a result, part of the HF power arriving from the oscillator output 10 can be tapped, so that the output 16 of the power calibration is variably adjustable with regard to the HF power via the blocking voltage 14. The HF switch comprises at least one diode. PIN diodes, which because of their inertia can advantageously be used as direct-voltage-dependent HF resistors, are especially well suited.

Figure 2:
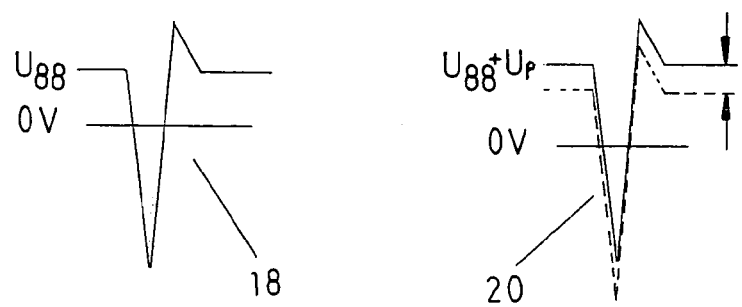
FIG. 2, the change in the input signal when HF power is applied.

In FIG. 2, the change in the input signal without input power 18 is shown schematically in comparison to the input signal with HF power 20 applied. $U_{BB}$ represents the external blocking voltage 14. The voltage difference (represented by $U_P$) is proportional to the HF output power of the oscillator.

Figure 3:
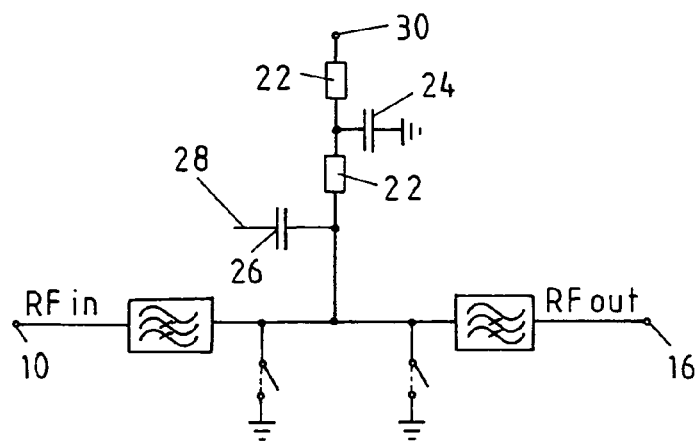
FIG. 3, a schematic circuit diagram of a device according to the invention for power calibration of an oscillator.

FIG. 3 shows a schematic circuit diagram of a device according to the invention for power calibration of an oscillator. To make it possible to avoid using an expensive semiconductor, such as a detector diode, it is provided according to the invention that the control input 30 of the HF switch be used both for feeding in the blocking voltage and for measuring the HF power. The amplifier (as a rule a transistor), not shown in FIG. 3, is connected to the oscillator output 10 via the HF switch (comprising the two PIN diodes 22 and the capacitor 24). According to the invention, the fact that PIN diodes 22 of the HF switch can be highly advantageously used as direct-voltage-dependent HF resistors is exploited. For bidirectional use of the HF switch, the control input 30 of the HF switch is connected to both the input 31 of the control module (not shown here) and to the amplifier (specifically, to its drain).

Figure 4:
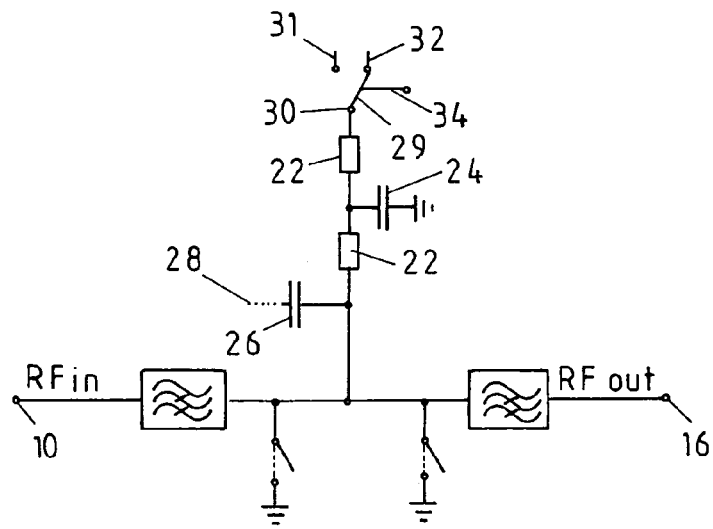
FIG. 4, a schematic circuit diagram of a device according to the invention for power calibration of an oscillator, having a distributor switch.

FIG. 4 shows a schematic circuit diagram of a device according to the invention for power calibration of an oscillator, with a distributor switch 29. The distributor switch 29 connects the control input 30 of the HF switch (comprising 22 and 24) selectively to the output 34 of the control module 40 and to the drain of the amplifier for feeding in of the blocking voltage 14, or to the input 31 of the control module 40. As a result, a switchover can selectively be made to feeding in the blocking voltage 14 or to measuring the diode voltage (which is done in the control module by evaluating the direct voltage generated by the PIN diodes). The disconnection of the blocking voltage 14 is necessary, because the A/D converter (not shown in FIG. 4) that does the measuring is operated in its operating range of from 0 to 3 V. With a blocking voltage 14, which can certainly amount to 3 V, conversion would no longer be possible.

Figure 5:
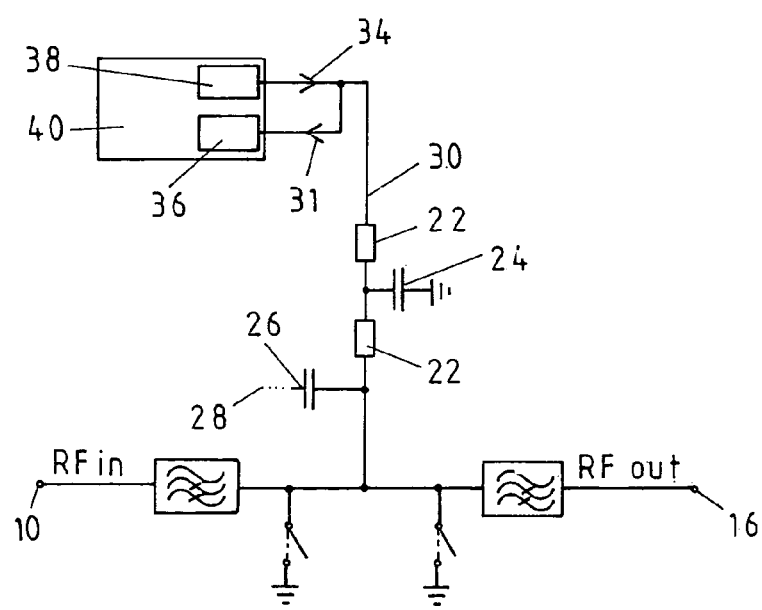
FIG. 5, a schematic circuit diagram of a device according to the invention for power calibration of an oscillator, having a hard-wired input and output of the control module.

FIG. 5 shows a schematic circuit diagram of a device of the invention for power calibration of an oscillator, in which the HF switch (comprising 22 and 24) is hard-wired to the drain of the amplifier, to the input 31 of the control module 40, and to the output 34 of the control module 40. As a result, the use of a distributor switch 29 can be avoided. The control module 40 has a processor, an A/D converter 36, and a D/A converter 38. The blocking voltage 14 is supplied via the amplifier and the D/A converter 38; measurement is done after the switchover via an A/D converter 36. Because the D/A converter 38 is switched to the tristate mode during the measurement of the (PIN) diode voltage and thus becomes high-impedance, this D/A converter 38, because of its high-impedance performance, has no interfering influence on the measurement of the diode voltage, and a temporary disconnection of the D/A converter 38 is therefore no longer necessary.

Figure 6:
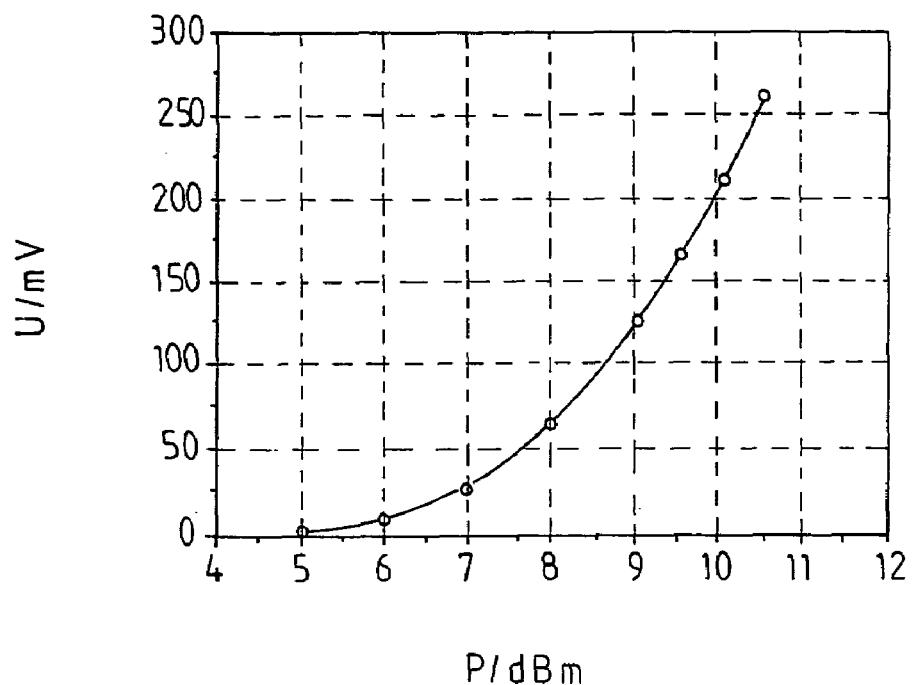
FIG. 6, the characteristic code of the diode voltage, over the applied HF power.

The voltage value read in by the control module 40 (via the A/D converter 36) for measuring the HF output power can be further processed by the processor, in order to readjust the buffer amplifier (not shown here) via its drain voltage. The characteristic curve of the diode voltage over the applied HF power is shown schematically in FIG. 6 and is needed for determining the HF output power of the oscillator.

Figure 7:
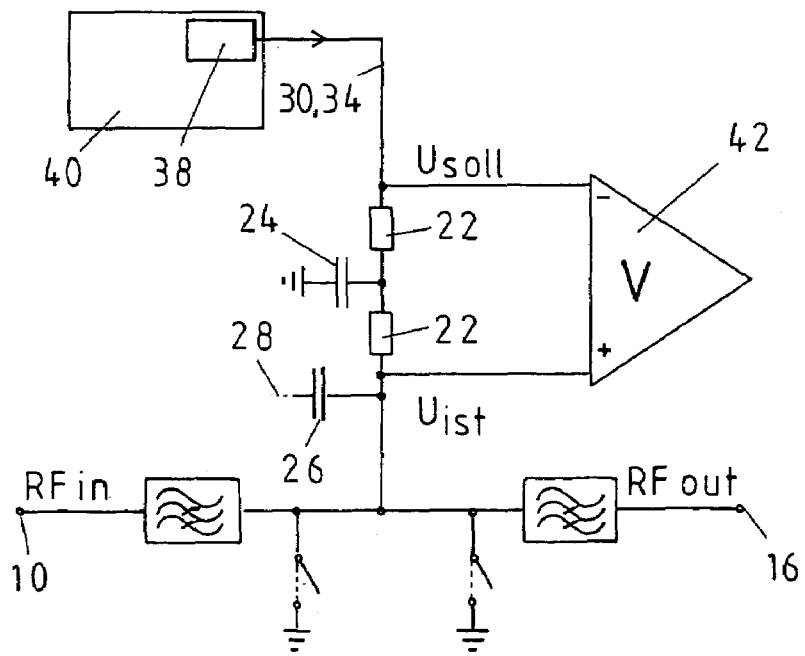
FIG. 7, a schematic circuit diagram of a device according to the invention for power calibration of an oscillator, having a differential amplifier.

FIG. 7 shows a schematic circuit diagram of a device of the invention for power calibration of an oscillator, with a differential amplifier. As before, the blocking voltage 34 is specified by the control module 40 and serves as a reference voltage for the differential amplifier 42. The differential amplifier 42 amplifies the difference between the set-point value (the set blocking voltage) and the actual value (the set blocking voltage+diode voltage), as a function of the HF power. This voltage is then supplied to the buffer amplifier (not shown here), which readjusts accordingly.

The invention is not limited to the exemplary embodiments shown here. On the contrary, by combination and modification of the means and characteristics recited, it is possible to implement further variant embodiments, without departing from the scope of the invention.

The invention claimed is:

1. A device for power calibration of an oscillator, having an amplifier and an HF switch, for varying the HF output power of the oscillator, and having a control module for comparing the HF output power of the oscillator with a set-point power and for controlling the amplifier, wherein the input of the control module is electrically connectable to the control input of the HF switch, and the output of the control module is electrically connectable to the control input of the HF switch and/or with the amplifier, and wherein the HF switch has two PIN diodes for providing a measurement voltage.

2. A device for power calibration of an oscillator, having an amplifier and an HF switch, which has at least one diode, for varying the HF output power of the oscillator, and having a control module for comparing the HF output power of the oscillator with a set-point power and for controlling the amplifier, wherein the input of the control module is electrically connectable to the control input of the HF switch, and the output of the control module is electrically connectable to the control input of the HF switch and/or with the amplifier, and wherein a distributor switch is connectable to the amplifier, the HF switch, and the control module.

3. The device according to claims 1, and wherein the control module has a controller and/or a processor and/or an A/D converter and/or a D/A converter.

4. A device for power calibration of an oscillator, having an amplifier and an HF switch, which has at least one diode, for varying the HF output power of the oscillator, and having a control module for comparing the HF output power of the oscillator with a set-point power and for controlling the amplifier, wherein the input of the control module is electrically connectable to the control input of the HF switch, and the output of the control module is electrically connectable to the control input of the HF switch and/or with the amplifier, and wherein the output of the control module and the input of the control module are electrically connected permanently to the control input of the HF switch.

5. A device for power calibration of an oscillator, having an amplifier and an HF switch, which has at least one diode, for varying the HF output power of the oscillator, and having a control module for comparing the HF output power of the oscillator with a set-point power and for controlling the amplifier, wherein the input of the control module is electrically connectable to the control input of the HF switch, and the output of the control module is electrically connectable to the control input of the HF switch and/or with the amplifier, wherein the device has a differential amplifier.

6. The device according to claim 5, wherein the inputs of the differential amplifier are connected to a reference line and to the output line of the oscillator, and the output of the differential amplifier is connected to the amplifier.

7. A method for power calibration of an oscillator by measurement and variation of the HF output power of the oscillator, wherein via an HF switch, an HF signal for measuring the HF output power of the oscillator is decoupled, and a blocking voltage for varying the output power of the oscillator is fed in, and wherein feeding in of a blocking voltage for varying the HF output power of the oscillator is interrupted during the decoupling of the HF signal for measuring the HF output power of the oscillator.

8. A method for power calibration of an oscillator by measurement and variation of the HF output power of the oscillator, characterized in that via an HF switch, an HF signal for measuring the HF output power of the oscillator is decoupled, and a blocking voltage for varying the output power of the oscillator is fed in, and wherein during the decoupling of the HF signal for measuring the HF output power of the oscillator, the D/A converter is switched into a tristate mode.

* * * * *